US 6,729,750 B2

(12) United States Patent
Janisch et al.

(10) Patent No.: US 6,729,750 B2
(45) Date of Patent: May 4, 2004

(54) BRAKE LEVER DIMMER SWITCH

(75) Inventors: Darrel Janisch, Thief River Falls, MN (US); Ron Bergman, McIntosh, MN (US)

(73) Assignee: Arctic Cat, Inc., Thief River Falls, MN (US)

( * ) Notice: Subject to any disclaimer, the term of this patent is extended or adjusted under 35 U.S.C. 154(b) by 68 days.

(21) Appl. No.: 10/175,993

(22) Filed: Jun. 18, 2002

(65) Prior Publication Data

US 2003/0231504 A1 Dec. 18, 2003

(51) Int. Cl.$^7$ ................ B60J 6/02; B62L 3/02
(52) U.S. Cl. ........... 362/475; 362/473; 180/333
(58) Field of Search .................. 362/473, 474, 362/475, 529; 180/333; 340/432

(56) References Cited

U.S. PATENT DOCUMENTS

| | | | |
|---|---|---|---|
| 5,432,686 A | * | 7/1995 | Meyer .................... 362/493 |
| 6,135,625 A | * | 10/2000 | Kodaira et al. ............ 362/476 |
| 6,439,753 B1 | * | 8/2002 | Sumada et al. ........... 362/475 |
| 2002/0108801 A1 | * | 8/2002 | McAllister ................ 180/333 |

* cited by examiner

Primary Examiner—Y. My Quach-Lee
Assistant Examiner—Peggy A. Neils
(74) Attorney, Agent, or Firm—Merchant & Gould, P.C.

(57) ABSTRACT

An apparatus and method for controlling a headlight system. The apparatus includes a control yoke control unit having a brake control, a dimmer switch, an actuating mechanism, and at least one control support for supporting the brake control and dimmer switch. Both controls are incorporated into the control unit. The control unit may have only a single control support with both controls therein, or it may have two control supports each with one control. The control unit also includes an electrical connector for connecting the dimmer switch to a headlight and a source of electrical power. The actuating mechanism is movable in first and second directions from a neutral position, such that moving the actuating mechanism from the neutral position in the first direction actuates the brake control, and moving the actuating mechanism from the neutral position in the second direction actuates the dimmer switch.

25 Claims, 6 Drawing Sheets

BRAKE LEVER DIMMER SWITCH

BACKGROUND OF THE INVENTION

The invention relates to an apparatus and method for controlling a headlight. The invention also relates to an apparatus and method for controlling one or more headlights mounted on a vehicle, using an existing control location.

In particular, it is known to mount headlights on so-called light recreational vehicles, that is, vehicles smaller than an ordinary automobile. Such vehicles include four-wheelers or all-terrain vehicles (ATVs), snowmobiles, etc.

It is common to mount electric headlights on vehicles for the purpose of illuminating an area ahead of the vehicle, so that the vehicle operator may see the path ahead.

Many such headlights have more than one setting. For example, a headlight might have a "high beam" setting wherein the headlight produces relatively intense light directed over a narrowly focused area, and a "low beam" setting wherein the headlight produces less intense light directed over a relatively broad area. Typically, the high beam setting is used when the path ahead is free of other vehicles and pedestrians, since although it provides superior illumination, it also can blind persons in its path. The low beam setting is used when persons or other vehicles are nearby.

Because vehicles or persons may enter and leave the path of the snowmobile frequently, it is useful to be able to switch the headlight rapidly and conveniently from one setting to another.

Switch mechanisms used for this purpose are commonly referred to as dimmer switches. A variety of conventional dimmer switch mechanisms have been used to control headlights on light recreational vehicles. However, conventional dimmer switches are not entirely satisfactory.

Many light recreational vehicles utilize control yokes, also sometimes referred to as handlebars. A control yoke generally includes one or more bars positioned transverse to a steering column. Locating the dimmer switch for the vehicle's headlights on the yoke is convenient, since vehicle operators may then activate the dimmer switch without moving their hands from the control yoke, and thus may conveniently steer and operate the vehicle while adjusting the vehicle's headlights.

However, the control yokes on most vehicles already include one or more control mechanisms. For example, the brake control for many conventional steering yokes is mounted on the left bar. Adding another control elsewhere on the yoke may be difficult or inconvenient.

Conventional dimmer switches may be mounted elsewhere than on the control yoke. For example, controls may be mounted on the body of the vehicle, or at the junction between the two bars of the yoke. However, this makes it necessary to remove one hand from the control yoke in order to adjust the headlights. In addition, the operator may have to divert his or her eyes from the path ahead in order to search for the control.

SUMMARY OF THE INVENTION

The present invention provides an apparatus and method for controlling a vehicle headlight from a control yoke, by combining a dimmer switch for the headlight with other controls present on the control yoke.

In accordance with the principles of the present invention, this may be accomplished with a handlebar control unit having a brake control, a dimmer switch, and a control support for supporting the brake control and dimmer switch.

The control unit also includes an actuating mechanism. The actuating mechanism is moveable in two directions from a neutral position. Moving the actuating mechanism in the first direction actuates the brake control. Moving the actuating mechanism in the second direction actuates the dimmer switch.

The handlebar control unit is affixed to the yoke of a vehicle. The control unit also includes an electrical connection for connecting the dimmer switch to a headlight and a source of electrical power.

The control unit may have either a single, integral control support with the brake control, the dimmer switch, and the actuating mechanism mounted therein. Alternatively, the control unit may have several control supports, each supporting one or more of the brake control, dimmer switch, and actuating mechanism.

The handlebar control unit may be retrofitted to the control yoke of an existing vehicle.

BRIEF DESCRIPTION OF THE DRAWINGS

Like reference numbers generally indicate corresponding elements in the figures.

DETAILED DESCRIPTION OF THE PREFERRED EMBODIMENT

Referring to the attached figures, an embodiment of a handlebar control unit 10 in accordance with the principles of the claimed invention is shown therein.

Figure 1:
FIG. 1 is top view of an embodiment of control unit in accordance with the principles of the claimed invention, with the actuator in the neutral position.
Figure 5:
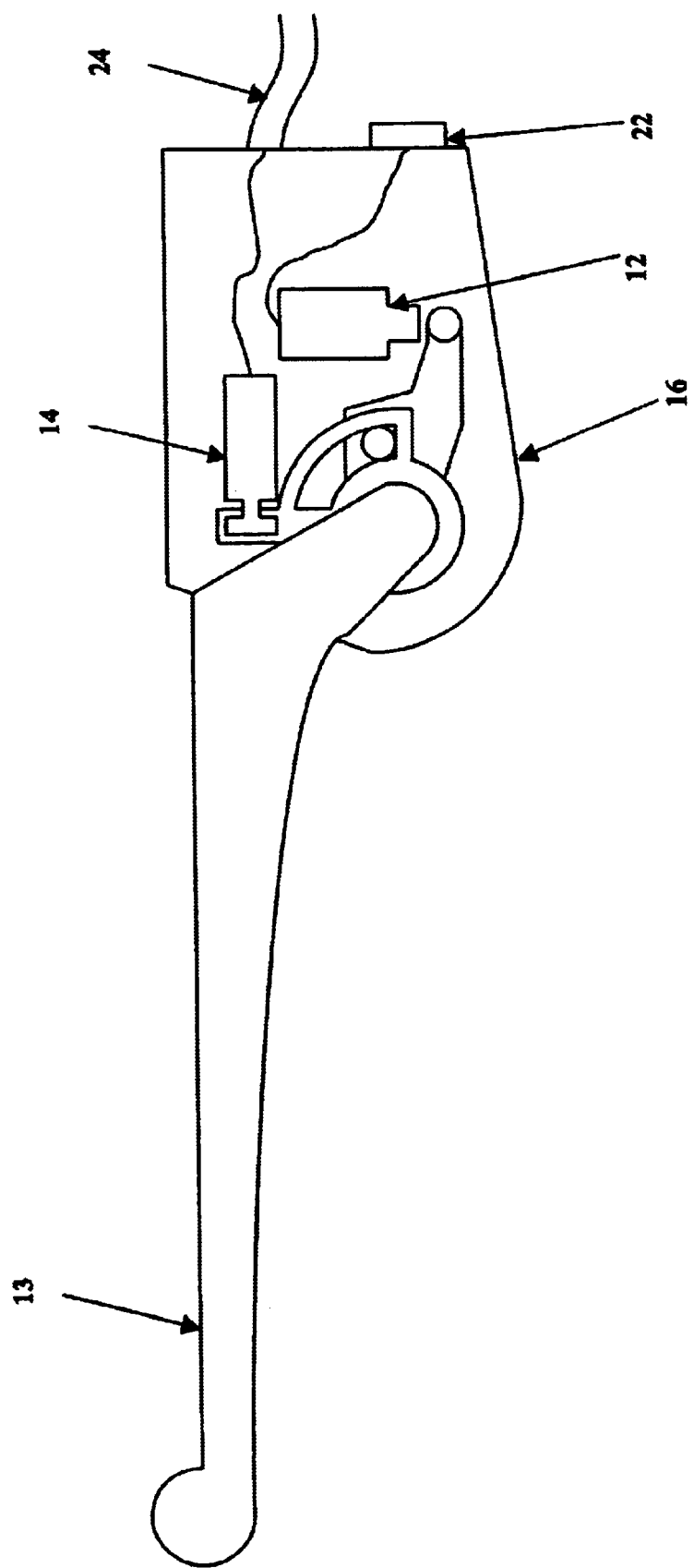
FIG. 5 is a top view of a portion of the control unit of FIG. 1, showing the switches.

The control unit 10 as shown in FIG. 5 includes a brake control 12, a dimmer switch 14, and an actuating mechanism 13. The control unit 10 also includes a control support 16 for supporting the brake control 12, the dimmer switch 14, and the actuating mechanism 13. The control unit 10 as shown in FIG. 1 is attached to a control yoke 18 of a vehicle. Preferably, the control unit 10 is attached to the yoke 18 proximate a grip portion 20.

The control support 16 provides physical support for the brake control 12, the dimmer switch 14, and the actuating mechanism 13. The brake control 12, the dimmer switch 14, and the actuating mechanism 13 are typically at least partially enclosed within the control support 16.

The control support 16 may be made of any suitably durable material, including but not limited to plastic, rubber, and metal.

Figure 2:
FIG. 2 is a top view of the control unit of FIG. 1 with the actuator moved in the first direction.

The actuating mechanism 13 normally rests in a neutral position, shown in FIG. 1. However, as may be seen from FIGS. 2 and 3, the actuating mechanism 13 is movable in two directions. Moving the actuating mechanism 13 away from the neutral position in the first direction as shown in FIG. 2 actuates the brake control 12. Moving the actuating mechanism 13 away from the neutral position in the second direction as shown in FIG. 3 actuates the dimmer switch 14.

Figure 3:
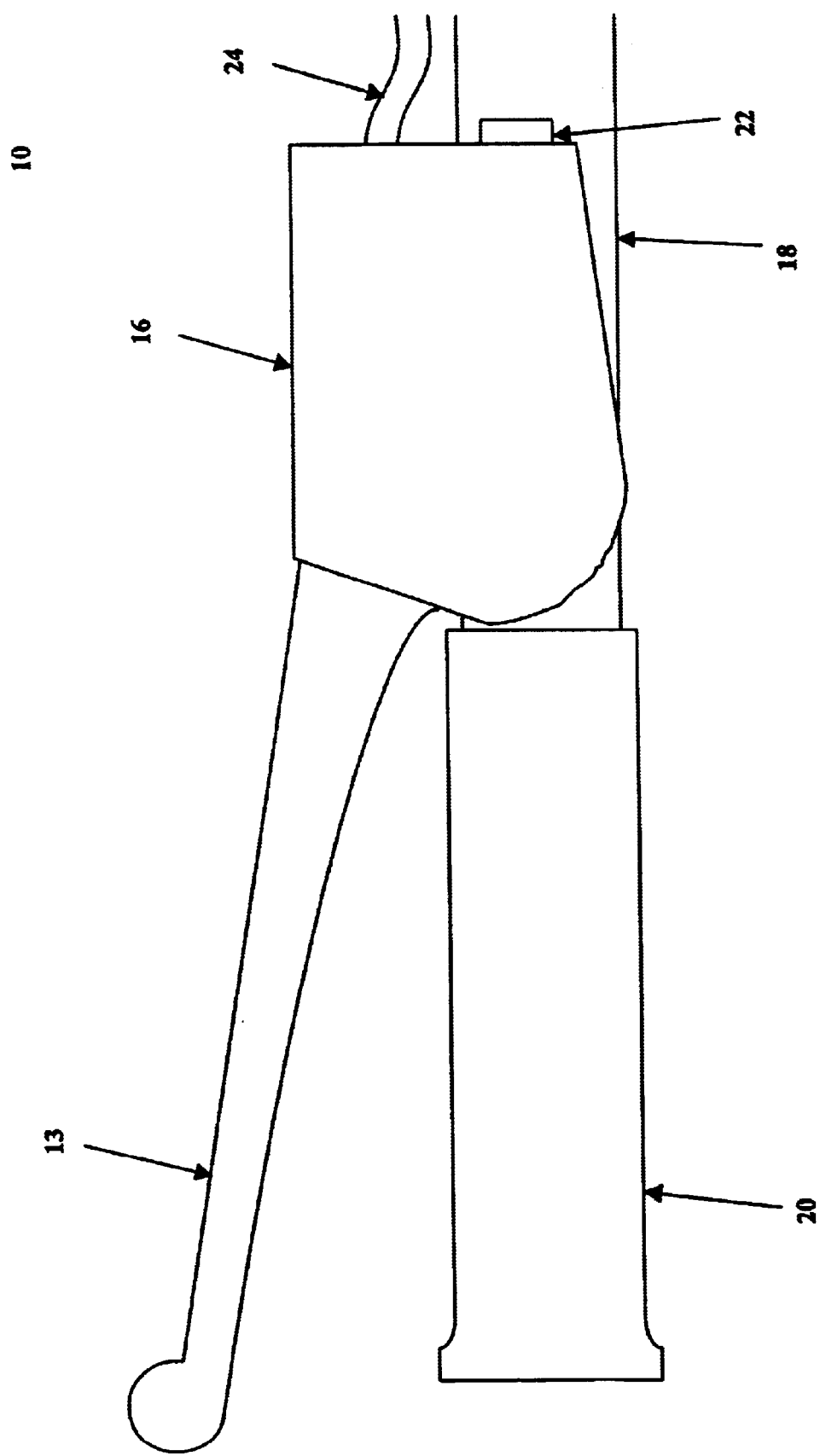
FIG. 3 is a top view of the control unit of FIG. 1 with the actuator moved in the second direction.

As shown in FIGS. 1–3, the first direction of movement is towards the grip portion 20, and the second direction of motion is away from the grip portion 20. However, this is exemplary only, and actuating mechanisms 13 that move in other directions may be equally suitable. In particular, it is pointed out that while the motions shown in FIGS. 1–3 are pivoting motions, it is not necessary for the first and second directions to be pivoting directions; actuating mechanisms 13 that move in first and second linear or rotational motions may be equally suitable.

It is noted that it is the motion from the neutral position that actuates the brake control 12 or the dimmer switch 14. Returning to the neutral position does not actuate either control.

For example, if the actuating mechanism 13 is displaced in first direction as shown in FIG. 2, it will be necessary for it to move in the second direction in order to return to the neutral position shown in FIG. 1. However, moving in the second direction back to the neutral position does not actuate the dimmer switch 14. Likewise, moving in the first direction from the position shown in FIG. 3 back to the neutral position does not actuate the brake control 12.

Suitable mechanisms for the actuating mechanism 13 are well known, and are not described further herein.

In the embodiment shown in FIGS. 1–4, the brake control 12 and the dimmer switch 14 are completely enclosed within the control support 16. For clarity, FIG. 5 illustrates a cut-away view that shows the brake control 12 and the dimmer switch 14.

As illustrated therein, the actuating mechanism 13 pivots in such a way that moving from the neutral position in the first direction actuates the brake control 12, and moving from the neutral position in the second direction actuates the dimmer switch 14.

A wide variety of switches may be suitable for use as the dimmer switch 14, including but not limited to, push switches, rocker switches, and slide switches. Similarly, a wide variety of mechanisms may be suitable for use as the brake control 12. Suitable mechanisms for the brake control 12 and the dimmer switch 14 are well known, and are not described further herein.

Likewise, the arrangement of actuating mechanism 13, brake control 12, and dimmer switch 14 shown in FIG. 5 is exemplary only. A variety of alternative arrangements may be equally suitable.

Although the dimmer switch 14 is described herein as switching between a high beam setting and a low beam setting, it is noted that this is exemplary only. The dimmer switch 14 is not limited to only high beam and low beam positions. For example, the dimmer switch 14 may toggle one or more headlights on and off. In addition, the dimmer switch 14 may include more than two settings, for example, a high beam setting, a low beam setting, and a fog setting.

As illustrated in FIGS. 1–3, a control unit 10 may have a single control support 16 that supports the brake control 12, the dimmer switch 14, and the actuating mechanism 13. That is, they may be mounted in a single, integral control support 16. However, this is exemplary only.

Figure 4:
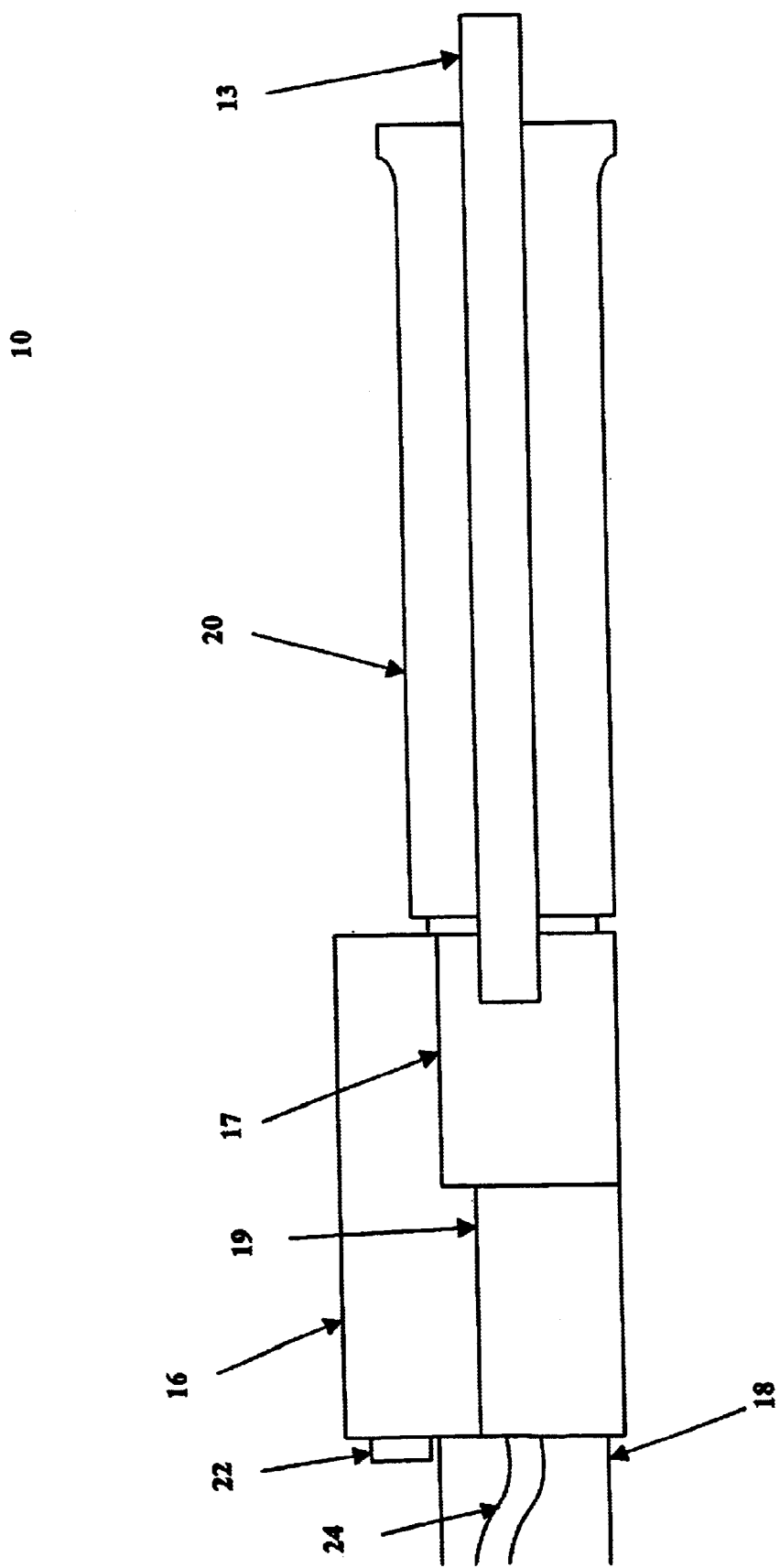
FIG. 4 is a front view of the control unit of FIG. 1.

For example, as illustrated in FIG. 4, a control unit 10 may alternatively have a first control support 16, a second control support 17, and a third control support 19. In the embodiment shown therein, the first control support 16 supports the dimmer switch 14, the second control support 17 supports the actuating mechanism 13, and the third control support 19 supports the brake control 12. In such a configuration, the control unit 10 may be assembled in modular fashion, by connecting a first control support 16 with a dimmer switch 14, a second control support 17 with an actuating mechanism 13, and a third control support 19 with a brake control 12 to a yoke 18.

A control unit 10 might also have two control supports, one supporting any one of the brake control 12, the actuating mechanism 13, and the dimmer switch 14, and the other control support supporting the other two.

The control unit 10 may be affixed to the control yoke 18 in any suitable fashion. Mechanisms for connecting the control unit 10 to the control yoke 18 include, but are not limited to, screws, bolts, catches, clamps, and adhesives. Connecting mechanisms are well known, and are not described further herein.

The control unit 10 and is advantageously disposed near the grip portion 20 of the control yoke 18. This enables the vehicle's operator to conveniently activate the control unit 10 without removing his or her hands from the grip 20. However, the precise arrangement of the control unit 10 with respect to the hand grip 20 is exemplary only, and arrangements other than those illustrated herein may be equally suitable. For example, for certain embodiments it may be convenient to dispose the control unit 10 on or in the hand grip 20 itself, either as an integral part of the hand grip 20 or as a separate component mounted thereto.

As illustrated herein, for certain embodiments it may be advantageous that the grip portion 20 is enlarged and/or contoured. In addition, for certain embodiments it may be advantageous that the grip portion 20 includes padding, and/or is at least somewhat flexible and resilient.

However, this is exemplary only. Contours and sizes that differ from those illustrated herein may be equally suitable. Furthermore, for certain embodiments, the grip portion 20 may not be contoured at all, and may even be nothing more than a simple extension of the yoke 18.

It is noted that the control unit 10 may be retrofitted to an existing control yoke 18. In certain embodiments, an existing control unit (i.e. for brakes only) might be entirely removed, and the control unit 10 of the present invention may be attached in its place.

In other embodiments, only portions of an existing control unit may be removed and replaced, for example an existing control support with any internal switch mechanisms might be removed, and replaced with a control unit 16 of the present invention with brake control 12 and dimmer switch 14 therein.

Alternatively, in certain embodiments it may be advantageous to simply add components. For example, it may be preferable to add a dimmer switch 14 to the inner works of an existing control unit in such a way as to bring the existing control unit into accordance with a control unit 10 as shown and described herein.

However, such retrofit options are exemplary only. The precise manner of retrofitting will depend at least in part on the structure of the existing control yoke. Other retrofit options may be equally suitable. Likewise, the claimed invention is not limited only to retrofitting, and may be installed during the original construction of a vehicle and/or control yoke.

As illustrated in FIG. 1, the control unit 10 includes an electrical connector 22 for connecting the dimmer switch 14 to a source of electrical power and a headlight. As illustrated in FIG. 1, the electrical connector 22 consists of a pin connector. However, this is exemplary only. A variety of alternative electrical connectors may be suitable, including but not limited to wires and cables.

Figure 6:
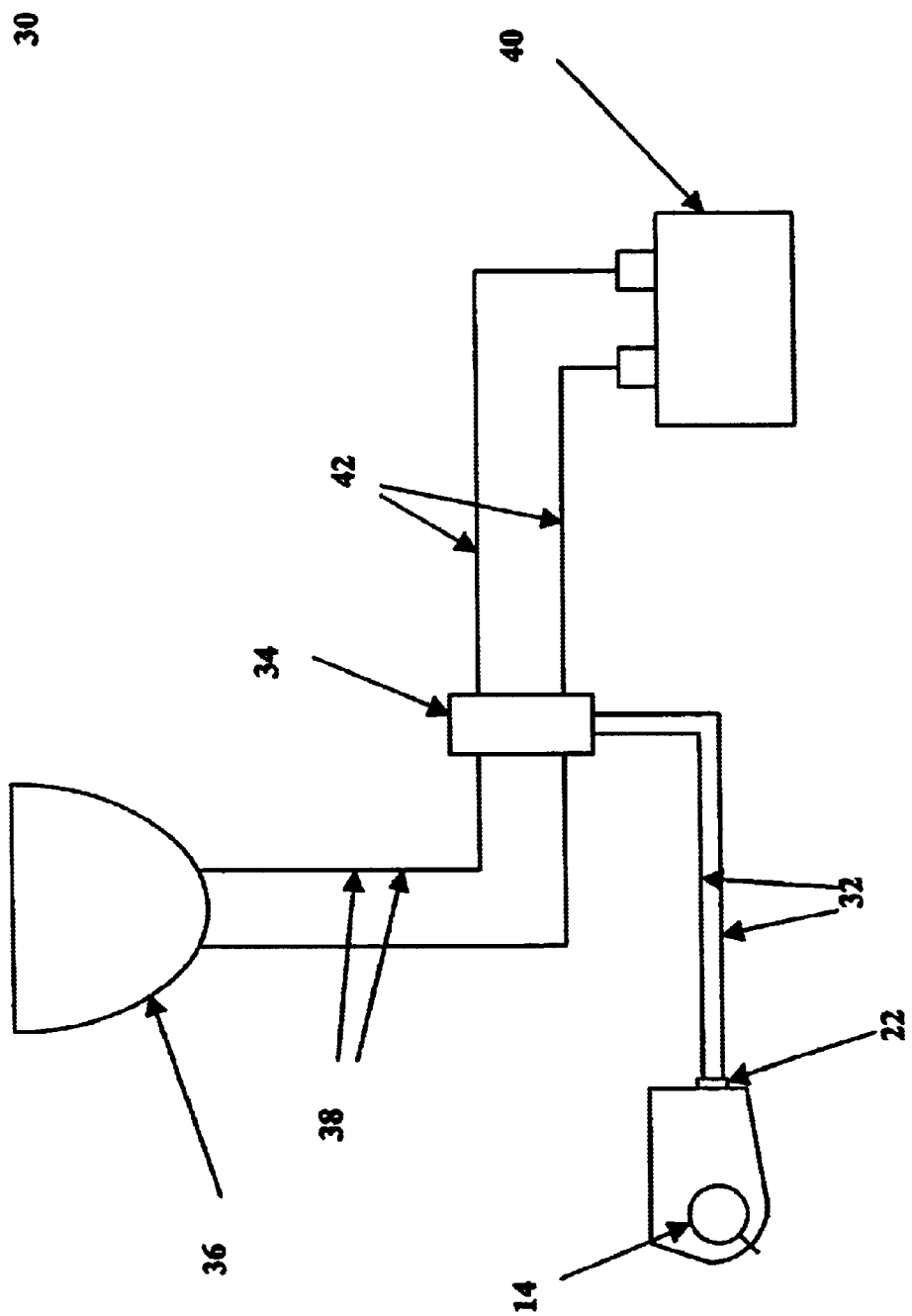
FIG. 6 is a schematic diagram of an embodiment of a headlight system in accordance with the principles of the claimed invention.

Additional description regarding electrical connections with the dimmer switch 14 is provided with regard to FIG. 6.

In addition, the control unit 10 may include a brake connector 24 for connecting the brake control 12 with a braking mechanism. As illustrated in FIG. 1, the brake connector 24 includes an external electrical cable. However, this is exemplary only, and other brake connectors 24 may be equally suitable, including but not limited to internal electrical cables, and internal or external tension cables.

It will be appreciated by those of skill in the art that the particular brake connectors that are suitable for a given embodiment may depend at least partially on the type of brake mechanism and brake control 12 in that embodiment. For example, a tension cable may be suitable for certain mechanical brake mechanisms and brake controls, and electric wiring may be suitable for certain electrical brake mechanisms.

Brake connectors 24 and brake mechanisms are well known, and are not described further herein.

FIG. 6 shows a diagram of the various components of an exemplary headlight system 30 to which a dimmer switch 14 in accordance with the principles of the claimed invention might be connected.

As illustrated in FIG. 6, the electrical connector 22 for the dimmer switch 14 is connected electrically to switch cables 32. The switch cables 32 are connected at their opposite end to a switching mechanism 34.

As illustrated, there are two switch cables 32, one positive and one negative. However, this is exemplary only. For certain embodiments, it may be equally suitable to have a different number of switch cables 32, i.e. to use a single coaxial cable, or a bundled cable with positive and negative paths side-by-side, or a single cable and a common (i.e. chassis) ground, etc.

In the embodiment illustrated, the switching mechanism 34 acts to control the flow of operating current through the headlight system 30, based on the position of the dimmer switch 14 That is, the dimmer switch 14 does not control the flow of current directly; rather, the dimmer switch 14 controls the switching mechanism 34, which in turn controls the flow of current through the headlight system 30. It is often advantageous to use a switching mechanism 34 as an intermediate device when using hand-operated switches such as the dimmer switch 14 to control a powerful electrical system such as that necessary to operate a headlight. In this way, the dimmer switch 14 that the operator actually touches is only energized with enough power to operate the switching mechanism 34.

If an intermediate switching mechanism 34 is not used, it is necessary to energize the dimmer switch 14 with enough power to operate the entire headlight system 30. In such an arrangement it would be necessary to provide a current path to and from the dimmer switch 14 that is robust enough to accept the electrical loads, i.e. a heavy insulated cable.

Nevertheless, the use of a separate switching mechanism 34 is exemplary only, and it may be excluded from certain embodiments of the claimed invention.

A variety of switching mechanisms 34 may be suitable, including but not limited to relays. Suitable switching mechanisms are well known, and are not described further herein.

Returning to FIG. 6, in the exemplary embodiment illustrated therein, the switching mechanism 34 is connected to a headlight 36 by headlight cables 38. As with the switch cables 32, two headlight cables 38 are illustrated, one positive and one negative. However, this is exemplary only, and it may be equally suitable to have a different number of headlight cables 38.

In addition, the switching mechanism 34 is connected to a power source 40 by power cables 42. As illustrated in FIG. 6, the power source 40' is a battery. However, this is exemplary only. Other power sources, including but not limited to a vehicle alternator or a separate electrical generator, may be equally suitable. As with the switch cables 32 and the headlight cables 38, two power cables 42 are illustrated, one positive and one negative. However, this is exemplary only. It may be equally suitable to have a different number of power cables 42.

It is noted that for certain embodiments, it may be convenient for the path from the brake connector 24 to the brake mechanism and the path from the electrical connector 22 to the remainder of the headlight system 30 to be adjacent or proximate one another for at least some portion of their lengths. For example, they may share a conduit, etc. However, this is exemplary only, and it may be equally suitable for their paths to be completely separate.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A control yoke control unit comprising:

a brake control;

a dimmer switch;

at least one actuating mechanism;

at least one control support for supporting said brake control, said actuating mechanism, and said dimmer switch;

an electrical connector for connecting said dimmer switch to a headlight and a source of electrical power;

wherein said actuating mechanism is movable in first and second directions from a neutral position, such that moving said actuating mechanism in said first direction actuates said brake control, and moving said actuating mechanism in said second direction actuates said dimmer switch.

2. A control yoke control unit according to claim 1, wherein:

said brake control, said actuating mechanism, and said dimmer switch are disposed within and supported by a first control support of said at least one control support.

3. A control yoke control unit according to claim 2, wherein:

said first control support is a single, integral unit.

4. A control yoke control unit according to claim 1, further comprising:

at least a second control support;

wherein each of said dimmer switch, said brake control, and said actuating mechanism are disposed in one of said at least two control supports.

5. A control yoke control unit according to claim 1, wherein:

said dimmer switch is a toggle switch.

6. A control yoke control unit according to claim 1, wherein:

said dimmer switch is a two setting switch.

7. A control yoke control unit according to claim 6, wherein:

said dimmer switch is a ratcheting push—push switch.

8. A control yoke control unit according to claim 6, wherein:

said dimmer switch is actuatable between a high beam setting and a low beam setting.

9. A control yoke control unit according to claim 1, wherein:

said dimmer switch is actuatable between a plurality of settings.

10. A control yoke control unit according to claim 1, wherein:

said actuating mechanism comprises a lever.

11. A headlight system for a vehicle, comprising:

at least one headlight;

a power source in communication with said at least one headlight;

a control yoke control unit, said handlebar control unit comprising:
  at least one actuating mechanism;
  a brake control;
  a dimmer switch in communication with said at least one headlight and said power source, such that actuating said dimmer switch actuates said at least one headlight;
  at least one control support for supporting said brake control, said dimmer switch, and said actuating mechanism;
  wherein said actuating mechanism is movable in first and second directions from a neutral position, such that moving said actuating mechanism in said first direction actuates said brake control, and moving said actuating mechanism in said second direction actuates said dimmer switch.

12. A headlight system according to claim 11, wherein:

said brake control, said dimmer switch, and said actuating mechanism are disposed within and supported by a first control support of said at least one control support.

13. A headlight system according to claim 12, wherein:

said first control support is a single, integral unit.

14. A headlight system according to claim 11:

said control unit further comprises at least a second control support;

wherein each of said dimmer switch, said brake control, and said actuating mechanism are disposed in one of said at least two control supports.

15. A headlight system according to claim 11, wherein:

said actuating mechanism, said brake control switch, and said dimmer switch all are disposed at least partially within and are supported by one of said at least one control support.

16. A headlight system according to claim 11, wherein:

said dimmer switch is a toggle switch.

17. A headlight system according to claim 11, wherein:

said dimmer switch is a two setting switch.

18. A control yoke control unit according to claim 17, wherein:

said dimmer switch is a ratcheting push—push switch.

19. A headlight system according to claim 17, wherein:

said dimmer switch is actuatable between a high beam setting and a low beam setting such that said headlight actuates between a high beam setting and a low beam setting.

20. A headlight system according to claim 11, wherein:

said dimmer switch is actuatable between plurality of settings.

21. A headlight system according to claim 10, further comprising:

a switching mechanism in communication with said dimmer switch, said at least one headlight, and said power source, configured such that said dimmer switch is in communication with said at least one headlight and said power source via said switching mechanism;

wherein actuating said dimmer switch actuates said switching mechanism, whereby said switching mechanism actuates said at least one headlight.

22. A headlight system according to claim 1, wherein:

said actuating mechanism comprises a lever.

23. A vehicle, comprising:

a control yoke;

at least one headlight;

a power source in communication with said at least one headlight;

a control unit disposed on said control yoke, said control unit comprising:
  at least one actuating mechanism;
  a brake control;
  a dimmer switch in communication with said at least one headlight and said power source, such that actuating said dimmer switch actuates said at least one headlight;
  at least one control support for supporting said brake control, said dimmer switch, and said actuating mechanism;
  wherein said actuating mechanism is movable in first and second directions from a neutral position, such that moving said actuating mechanism in said first direction actuates said brake control, and moving said actuating mechanism in said second direction actuates said dimmer switch.

24. A vehicle according to claim 23, wherein:

said vehicle is one of the group consisting of a snowmobile, an all terrain vehicle, and a motorcycle.

25. Method for controlling a headlight system, comprising the steps of:

providing an actuating mechanism that is movable in first and second directions from a neutral position, such that moving said actuating mechanism from said neutral position in said first direction actuates a brake control, and moving said actuating mechanism from said neutral position in said second direction actuates a dimmer switch, wherein said actuating mechanism, said brake control, and said dimmer switch are supported by at least one control support of a control yoke control unit, and said dimmer switch being in communication with at least one headlight and a power source;

moving said actuating mechanism in said second direction so as to actuate said dimmer switch, thereby actuating said at least one headlight.

* * * * *